US010631192B2

(12) United States Patent
Dowlatkhah et al.

(10) Patent No.: US 10,631,192 B2
(45) Date of Patent: Apr. 21, 2020

(54) POLICY ENFORCED INTELLIGENT PERSONA MANAGER

(71) Applicants: AT&T INTELLECTUAL PROPERTY I, L.P., Atlanta, GA (US); AT&T Mobility II LLC, Atlanta, GA (US)

(72) Inventors: Sangar Dowlatkhah, Johns Creek, GA (US); Erie Lai Har Lau, Bellevue, WA (US)

(73) Assignees: AT&T INTELLECTUAL PROPERTY I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/827,028

(22) Filed: Aug. 14, 2015

(65) Prior Publication Data
US 2017/0048327 A1    Feb. 16, 2017

(51) Int. Cl.
*H04L 29/06* (2006.01)
*H04W 28/02* (2009.01)
(Continued)

(52) U.S. Cl.
CPC ..... *H04W 28/0268* (2013.01); *H04L 41/5006* (2013.01); *H04L 41/5048* (2013.01);
(Continued)

(58) Field of Classification Search
CPC ... H04L 67/306; H04L 12/14; H04L 12/5695; H04L 41/0896; H04L 41/5003; H04L 47/808; H04L 47/805; H04L 47/14; H04L 12/1407; H04L 41/5022; H04L 65/80; H04L 47/20; H04L 67/303; H04L 41/5009; H04L 41/5029; H04L 47/781; H04L 67/30; H04L 47/823; H04L 67/125; H04L 63/10;
(Continued)

(56) References Cited

U.S. PATENT DOCUMENTS 6,138,156 A * 10/2000 Fletcher ................ H04L 12/14
709/217
6,931,446 B1 * 8/2005 Cox .................... H04L 41/0893
709/208
(Continued)

OTHER PUBLICATIONS

Notice of Allowance received for U.S. Appl. No. 14/821,425 dated Jul. 31, 2018, 47 pages.
(Continued)

*Primary Examiner* — Backhean Tiv
*Assistant Examiner* — Linh T. Nguyen
(74) *Attorney, Agent, or Firm* — Amin, Turocy & Watson, LLP

(57) ABSTRACT

An intelligent persona manager is provided to dynamically and intelligently instantiate policies and rules for devices that are associated with a subscriber account. The intelligent persona manager can determine a device associated with a subscriber account can be used in many different scenarios and for different purposes, and the intelligent persona manager can determine which persona of the subscriber account is currently associated with the active session and select rules or policies to apply from a set of policies that are associated with the subscriber account.

20 Claims, 10 Drawing Sheets

(51) Int. Cl.
  *H04L 12/24* (2006.01)
  *H04L 12/927* (2013.01)
  *H04L 29/08* (2006.01)
  *H01L 29/08* (2006.01)

(52) U.S. Cl.
  CPC ........ *H04L 47/805* (2013.01); *H04L 65/4092* (2013.01); *H04L 65/80* (2013.01); *H04L 67/14* (2013.01); *H04L 67/306* (2013.01); *H04W 28/0215* (2013.01); *H04L 41/5022* (2013.01)

(58) Field of Classification Search
  CPC ..... H04L 67/22; H04L 65/1046; H04L 51/12; H04L 51/26; H04L 61/106; H04L 63/101; H04L 29/06027; H04L 63/0263; H04L 12/2818; H04L 12/4641; H04L 51/32; H04L 65/1006; H04L 65/1076; H04L 67/26; H04L 67/2823; H04L 67/2828; H04L 63/102; H04L 63/104; H04W 8/18; H04W 48/02; H04W 4/90; H04W 76/50; H04W 48/16; H04W 4/14; H04W 76/40; H04W 4/21; H04W 68/02; G06Q 50/22; G06Q 10/10; G06Q 50/01; G06Q 30/0269; G06Q 30/0629; H04M 11/04; H04M 2201/50; H04M 3/5116; H04M 1/72569; H04M 1/72577; G06F 16/9535; G06F 16/24578; G06F 16/285; G06F 16/48; G06F 16/122
  USPC ....... 709/226, 227, 229, 203, 217, 225, 206, 709/207; 455/452.1, 452.2, 401.1, 404.2, 455/413, 567; 340/573.1, 539.1, 539.12; 379/265.13, 88.19, 88.21, 201.02, 266.02; 705/14.66; 707/798, E17.046
  See application file for complete search history.

(56) References Cited

U.S. PATENT DOCUMENTS

| | | | |
|---|---|---|---|
| 7,581,030 B2 | 8/2009 | Dowling | |
| 7,890,576 B2 | 2/2011 | Button et al. | |
| 8,046,462 B2* | 10/2011 | Trappeniers | H04L 12/1485 709/226 |
| 8,360,975 B1 | 1/2013 | Schwieterman et al. | |
| 8,381,081 B1 | 2/2013 | Subbiah et al. | |
| 8,483,191 B2 | 7/2013 | Erdman et al. | |
| 8,750,123 B1 | 6/2014 | Alisawi | |
| 8,868,661 B2 | 10/2014 | Asawa et al. | |
| 8,984,282 B1 | 3/2015 | Kragh | |
| 9,065,936 B2 | 6/2015 | Goldner et al. | |
| 2001/0049790 A1 | 12/2001 | Faccin et al. | |
| 2003/0041048 A1* | 2/2003 | Balasuriya | H04M 3/436 |
| 2003/0105827 A1 | 6/2003 | Tan et al. | |
| 2003/0191663 A1* | 10/2003 | Sameh | G06Q 50/24 705/2 |
| 2004/0203648 A1* | 10/2004 | Wong | H04W 4/18 455/414.1 |
| 2005/0050017 A1* | 3/2005 | Ross et al. | G06F 17/30 777/999.003 |
| 2006/0031941 A1 | 2/2006 | Xiao et al. | |
| 2006/0041470 A1 | 2/2006 | Filho et al. | |
| 2007/0027715 A1 | 2/2007 | Gropper et al. | |
| 2007/0043594 A1 | 2/2007 | Lavergne | |
| 2007/0055545 A1 | 3/2007 | Maughan et al. | |
| 2007/0086475 A1 | 4/2007 | Clemens et al. | |
| 2007/0157022 A1 | 7/2007 | Blom et al. | |
| 2007/0192140 A1 | 8/2007 | Gropper | |
| 2008/0133716 A1* | 6/2008 | Rao | G06Q 30/08 709/220 |
| 2008/0293411 A1 | 11/2008 | Hinton et al. | |
| 2009/0259493 A1 | 10/2009 | Venon et al. | |
| 2010/0151841 A1* | 6/2010 | Metcalf | H04M 3/42178 455/414.1 |
| 2010/0262545 A1 | 10/2010 | Herlitz | |
| 2010/0311402 A1 | 12/2010 | Srinivasan et al. | |
| 2010/0311418 A1 | 12/2010 | Shi et al. | |
| 2010/0312852 A1* | 12/2010 | Kamga | H04L 67/2823 709/217 |
| 2010/0332258 A1 | 12/2010 | Dahlke et al. | |
| 2011/0021140 A1 | 1/2011 | Binier | |
| 2011/0028135 A1 | 2/2011 | Srinivasan | |
| 2011/0119088 A1 | 5/2011 | Gunn | |
| 2011/0197237 A1 | 8/2011 | Turner | |
| 2011/0225007 A1 | 9/2011 | Theis | |
| 2011/0243553 A1 | 10/2011 | Russell | |
| 2011/0264460 A1 | 10/2011 | Jagemann et al. | |
| 2011/0282688 A1 | 11/2011 | Raggousis | |
| 2012/0084092 A1 | 4/2012 | Kozuch et al. | |
| 2012/0093303 A1* | 4/2012 | Schultz | H04M 1/72569 379/159 |
| 2012/0101847 A1 | 4/2012 | Johnson et al. | |
| 2012/0155387 A1 | 6/2012 | Simons et al. | |
| 2012/0172089 A1 | 7/2012 | Bae et al. | |
| 2012/0277543 A1 | 11/2012 | Homchowdhury et al. | |
| 2012/0311657 A1 | 12/2012 | Boldyrev et al. | |
| 2012/0314644 A1 | 12/2012 | Lagerman | |
| 2012/0323691 A1 | 12/2012 | McLaughlin et al. | |
| 2013/0035063 A1* | 2/2013 | Fisk | H04M 1/72572 455/410 |
| 2013/0090942 A1 | 4/2013 | Robinson et al. | |
| 2013/0122863 A1 | 5/2013 | Chen et al. | |
| 2013/0124523 A1 | 5/2013 | Rogers et al. | |
| 2013/0132109 A1 | 5/2013 | Mruthyunjaya et al. | |
| 2013/0159288 A1* | 6/2013 | Nikankin | G06Q 40/025 707/722 |
| 2013/0231948 A1 | 9/2013 | Kim et al. | |
| 2013/0262155 A1 | 10/2013 | Hinkamp | |
| 2013/0290439 A1 | 10/2013 | Blom | |
| 2013/0297821 A1 | 11/2013 | Tanenbaum et al. | |
| 2013/0304486 A1 | 11/2013 | Jagemann et al. | |
| 2013/0326579 A1 | 12/2013 | Bhatti et al. | |
| 2013/0329552 A1 | 12/2013 | Carnero Ros et al. | |
| 2013/0346954 A1 | 12/2013 | Tryon et al. | |
| 2014/0004854 A1 | 1/2014 | Veran et al. | |
| 2014/0039912 A1 | 2/2014 | Turinas et al. | |
| 2014/0047526 A1 | 2/2014 | Huang | |
| 2014/0115507 A1 | 4/2014 | Bailey et al. | |
| 2014/0122119 A1 | 5/2014 | Hardy | |
| 2014/0180719 A1 | 6/2014 | Bell et al. | |
| 2014/0185521 A1 | 7/2014 | Aksu et al. | |
| 2014/0207686 A1 | 7/2014 | Experton | |
| 2014/0247716 A1 | 9/2014 | Xiao et al. | |
| 2014/0254491 A1 | 9/2014 | Lindholm | |
| 2014/0343989 A1* | 11/2014 | Martini | H04L 63/104 705/7.17 |
| 2014/0380044 A1 | 12/2014 | Ashley et al. | |
| 2015/0004967 A1 | 1/2015 | Jiang | |
| 2015/0006723 A1 | 1/2015 | Sheth et al. | |
| 2015/0009826 A1 | 1/2015 | Ma et al. | |
| 2015/0026461 A1 | 1/2015 | Devi | |
| 2015/0070516 A1* | 3/2015 | Shoemake | H04N 21/42203 348/207.11 |
| 2015/0101066 A1 | 4/2015 | Fram | |
| 2015/0147990 A1* | 5/2015 | Kreitzer | H04B 1/16 455/132 |
| 2015/0172993 A1 | 6/2015 | Jiang | |
| 2015/0188843 A1 | 7/2015 | Chauhan | |
| 2015/0213195 A1 | 7/2015 | Blechman | |
| 2015/0245241 A1 | 8/2015 | Posz et al. | |
| 2015/0296368 A1* | 10/2015 | Kaufman | H04W 8/18 455/418 |
| 2015/0309516 A1* | 10/2015 | Williams | G05D 23/1904 700/278 |
| 2015/0381571 A1 | 12/2015 | Plasse et al. | |
| 2016/0006571 A1* | 1/2016 | Teittinen | H04L 41/5025 455/405 |
| 2016/0029160 A1 | 1/2016 | Theurer et al. | |
| 2016/0034713 A1 | 2/2016 | Ramirez | |
| 2016/0088461 A1 | 3/2016 | Jiang | |

(56) References Cited

U.S. PATENT DOCUMENTS

| | | | |
|---|---|---|---|
| 2016/0125471 A1* | 5/2016 | Hsu | G06Q 30/0269 705/14.66 |
| 2016/0127777 A1* | 5/2016 | Roberts | H04N 21/4312 725/14 |
| 2016/0142878 A1 | 5/2016 | Saulnier | |
| 2016/0156770 A1* | 6/2016 | Vendrow | H04M 3/533 715/752 |
| 2016/0170991 A1* | 6/2016 | Birchall | G06F 17/3053 707/751 |
| 2016/0180033 A1 | 6/2016 | Rosenberg | |
| 2016/0203123 A1* | 7/2016 | Kozloski | G06F 17/2785 704/224 |
| 2016/0210416 A1 | 7/2016 | Whitehurst | |
| 2016/0269891 A1 | 9/2016 | Chen | |
| 2016/0275248 A1 | 9/2016 | Kim et al. | |
| 2016/0277368 A1 | 9/2016 | Narayanaswamy et al. | |
| 2016/0285998 A1* | 9/2016 | Hardy | H04L 41/0806 |
| 2016/0295544 A1 | 10/2016 | Jiang | |
| 2016/0314299 A1 | 10/2016 | Almer | |
| 2016/0315902 A1* | 10/2016 | Silva | H04L 51/32 |
| 2016/0342767 A1 | 11/2016 | Narasimhan et al. | |
| 2017/0118622 A1 | 4/2017 | Jiang | |
| 2017/0134516 A1* | 5/2017 | Gutman | H04L 67/26 |
| 2017/0243028 A1 | 8/2017 | LaFever et al. | |

OTHER PUBLICATIONS

Non-Final Office Action received for U.S. Appl. No. 15/910,903 dated Aug. 27, 2018, 29 pages.
Office Action for U.S. Appl. No. 14/821,425, dated Mar. 31, 2017, 18 pages.
Office Action for U.S. Appl. No. 14/821,450, dated May 31, 2017, 22 pages.
Non-Final Office Action received for U.S. Appl. No. 16/369,895 dated Jul. 22, 2019, 31 pages.
Non-Final Office Action received for U.S. Appl. No. 14/929,897 dated Aug. 8, 2019, 25 pages.
Office Action for U.S. Appl. No. 14/836,550, dated Aug. 24, 2017, 44 pages.
Office Action for U.S. Appl. No. 14/821,425, dated Sep. 7, 2017, 22 pages.
Office Action for U.S. Appl. No. 14/821,425 dated Jan. 8, 2018, 21 pages.
Notice of Allowance for U.S. Appl. No. 14/821,450 dated Nov. 28, 2017, 26 pages.
Office Action dated May 24, 2018 for U.S. Appl. No. 14/929,897, 43 pages.
Final Office Action received for U.S. Appl. No. 14/929,897 dated Nov. 15, 2018, 30 pages.

* cited by examiner

POLICY ENFORCED INTELLIGENT PERSONA MANAGER

TECHNICAL FIELD

The subject disclosure relates to application of a policy or policies with an intelligent persona manager in a networked environment.

BACKGROUND

In order to grant access to services and applications and provide a defined quality of service to subscribers, policies and rules may be enforced that are associated with the subscriber account. These rules are static, however, do not take into account changing context, and are unable to be changed without explicitly requesting and provisioning for additional services and quality of service.

DETAILED DESCRIPTION

Figure 1:
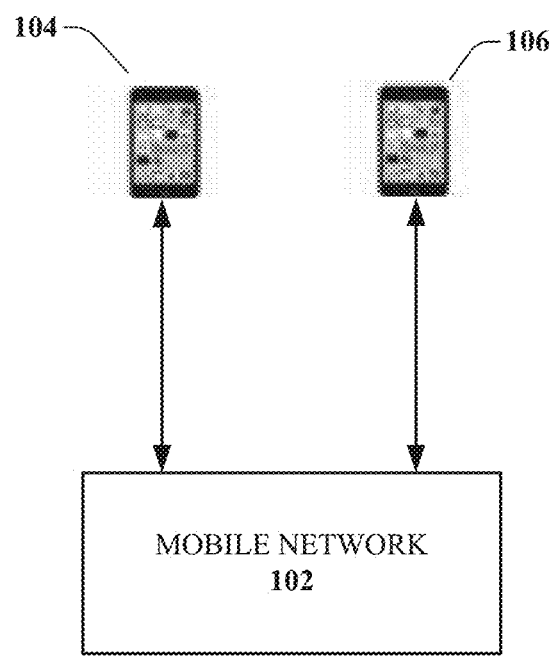
FIG. 1 is an example, non-limiting embodiment of a block diagram showing a mobile network that can dynamically instantiate policies using an intelligent persona manager in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In one or more embodiments, an intelligent persona manager system is provided to dynamically and intelligently instantiate policies and rules for devices that are associated with a subscriber account. The intelligent persona manager can determine a device associated with a subscriber account can be used in many different scenarios and for different purposes, and the intelligent persona manager can determine which persona of the subscriber account is currently associated with the active session and select rules or policies to apply from a set of policies that are associated with the subscriber account. The policies selected can control the services that are available at that time to the subscriber account, as well as control the quality of service and quality of experience.

In an embodiment, the intelligent persona manager system can also incorporate an API (Application Program Interface) manager to provide any third party service provider as an additional source/benefit. Additionally, a policy broker can collect additional requirements/policies from outside sources, and the intelligent persona manager can select the policies from the set of policies collected.

To dynamically adjust the subscriber account's services available and QoS/QoE (Quality of Service/Quality of Experience), the intelligent persona manager system can apply policy from multiple sources of configurations both internal (such as PCRF (Policy and Charging Rules Function), predefined policy databases, and user preferences) and also external requirements such as unexpected circumstances, change of service requests and other contextual information. These policies can be enforced in response to the subscriber logging into the system on per subscriber basis.

To enable the intelligent persona manager, the system can store predefined policies and can comprise a mechanism to collect and distribute policies accordingly. The intelligent persona manager can use a graph database to compare and evaluate existing contracts in order to determine which persona to apply. The intelligent persona manager can determine relationships between nodes of a graph structure, wherein the persona is related to the edges of the graph database, and the nodes are related to the subscriber accounts and devices associated with the active session. For instance, in a healthcare setting a patient can have multiple "contracts" with different doctors, hospitals, insurance companies, or relatives. At certain times, and depending on who the communications are to and from, the system can select and apply certain policies derived from these contracts that the system would not apply in other circumstances. A feedback system can be incorporated whereby a mobile network or the subscriber account can veto or override the selected policies, and the intelligent persona can use that information to fine tune and adjust the persona selection process by associating the new policy with the persona or the subscriber account.

For these considerations as well as other considerations, in one or more embodiments, a system comprises a processor and a memory that stores executable instructions that, when executed by the processor, facilitate performance of operations, comprising determining that a device associated with a subscriber account of a subscriber identity has initiated an active session. The operations also comprise retrieving policies associated with the subscriber account and determining a persona associated with the subscriber account based on contextual information determined to relate to the active session. The operations also comprise applying a policy of the policies, wherein the policy is based on the persona of the subscriber account.

In another embodiment, a method comprises determining, by a device comprising a processor, that a user equipment has initiated an active session with a network device of a mobile network. The method also comprises retrieving, by the device, policies from a user profile associated with the user equipment. The method also comprises determining, by the device, a role associated with the user profile based on contextual information determined to relate to the active session, wherein the role comprises information relating to a purpose and a priority of a communication associated with the active session. The method can also comprise applying, by the device, a policy of the policies, wherein the policy is selected based on the role of the user profile.

In another embodiment, a machine-readable storage medium, comprising executable instructions that, when executed by a processor, facilitate performance of operations comprising determining that a device associated with a subscriber account assigned to a subscriber identity has initiated an active session. The operations also comprise in response to requesting policies associated with the subscriber account, receiving the policies and determining a persona associated with the subscriber account based on contextual information relating to the active session, wherein the persona relates to an importance ranking of a communication associated with the active session. The operations further comprise applying a policy of the policies, wherein the policy is based on the persona of the subscriber account.

Turning now to FIG. 1, illustrated is an example, non-limiting embodiment of a block diagram 100 showing a mobile network 102 that can dynamically instantiate policies using an intelligent persona manager in accordance with various aspects described herein.

A mobile broadband network 102 generally comprises a radio access network that facilitates communications between the mobile devices 104 and 106 and a core network. In the case of Long Term Evolution ("LTE") networks and other 3rd Generation Partnership Project ("3GPP") compliant networks (e.g., LTE Advanced) and even non-3G PP systems such as WiMAX and CDMA2000, these networks are the radio access network and an evolved packet core network that can contain a series of components that provide mobile data and control management. The dynamic secure mobile network system disclosed herein can be utilized in network that comprises base station devices (eNodeBs) and Wi-Fi access points and other network access points. In some embodiments, the dynamic secure mobile network system can be operable with user equipment or networked devices that are not directly attached to a mobile network system but rather have wireline networked access. For the sake of simplicity, throughout this application, unless otherwise specifically states, reference will be made to a mobile network, but the subject matter disclosed herein can be operable in any networked environment.

In an embodiment, mobile network 102 can be in communication with mobile devices or other user equipments 104 and 106. In some embodiments, the user equipment 104 and 106 can be mobile devices, tablets, laptops, or desktop computers, or any other computing devices or combinations thereof. An active session that the user equipment 104 has with the mobile network 102 can have one or more data streams depending on which applications are active on the user equipment 104. For instance, each application active on the user equipment can have one or more data streams with the mobile network 102. In an embodiment, the mobile network 102 can transfer one or more of the data streams from the user equipment 104 to user equipment 106.

Policies and rules can be applied by the mobile network 102 to manage services available to user equipment 104 and 106 as well as the QoS and QoE of communications between the user equipment. The policies can comprise rules about which services are available, what modes of communications are allowed between the user equipment 104 and 106 such as whether text messages are allowed, voice communications, communications via one or more applications on the user equipment and et cetera. The policies can also provide for minimum and maximum as well as targeted bandwidth, priority, dedicated bearers, and other network decisions that can affect the QoE.

At certain times however, and with different contextual backgrounds, different policies may apply. The intelligent persona manager can elevate certain policies of the set of potential policies based on a persona that can be applied to either of the subscriber accounts associated with user equipment 104 and 106. For instance, in a health care setting, if user equipment 104 belonged to a patient, and user equipment 106 belonged to a doctor, the intelligent persona manager in the mobile network 102 can apply different policies or rules associated with the policies based on the type of communication. If there were an emergency, mobile network 102 may allow voice communications, or other real-time communications to be made from user equipment 104 to user equipment 106, but in other non-emergency situations, mobile network may only allow text messages or emails to be transferred. Similarly, depending on the context and purpose of the communications, mobile network 102 may enable or activate certain applications and services on either of the user equipment 104 and 106. In a healthcare setting such as this, the different personas can relate to the importance of the communications, or the purpose of the communications based on the content, timing, or parties to the communications.

In an embodiment, the users of devices 104 and 106 can have relationships more complex than just patient and doctor respectively. The users can be friends in addition to having a patient/doctor relationship. Different services can be made available and different QoS and QoE can be managed based on the persona of the active sessions related to the communications between devices 104 and 106. If the communication is related to the doctor/patient relationship, certain applications and/or services may be enabled on the devices that would not be enabled otherwise. On the other hand, if the communications are related to their friend relationship, those applications and services may not be available, and different QoS and QoE may be applied. The intelligent persona manager in the mobile network 102 can determine which persona is to be applied based on certain contextual information relating to the active sessions of the devices 104 and 106 with the mobile network 102 and each other. The contextual information can be based on some function that takes into consideration the time of the communications, the content of the communications, which applications are associated with the communications, locations of the devices 104 and 106 and other contextual information. Certain of the factors can be weighted differently based on their importance or preference information associated with the subscriber accounts.

In another specific example that can show generally how the intelligent person manager system can function, if device 104 belonged to a patient and device 106 belonged to a pharmacist, the intelligent persona manager in the mobile network 102 can assign an "emergency" persona to the communications in certain circumstances, and "non-emergency" persona in other circumstances. For instance, the intelligent persona manager in the mobile network 102 can retrieve information related to prescriptions or other treatment that are associated with the patient using the device 104, and if there is a possibility of an emergency situation based on the prescriptions, treatment, or other factors, the mobile network 102 can apply policies that enable a services or communications with a high priority between the device 104 and device 106. If the persona assigned is non-emergency, the communications can have lower priority and certain services may not be enabled (e.g., real time voice communications, etc.)

While brief reference has been made to an intelligent persona manager in a healthcare environment, this is not meant to be limiting as the principles of an intelligent persona manager can be implemented in a wide range of environments and settings.

Figure 2:
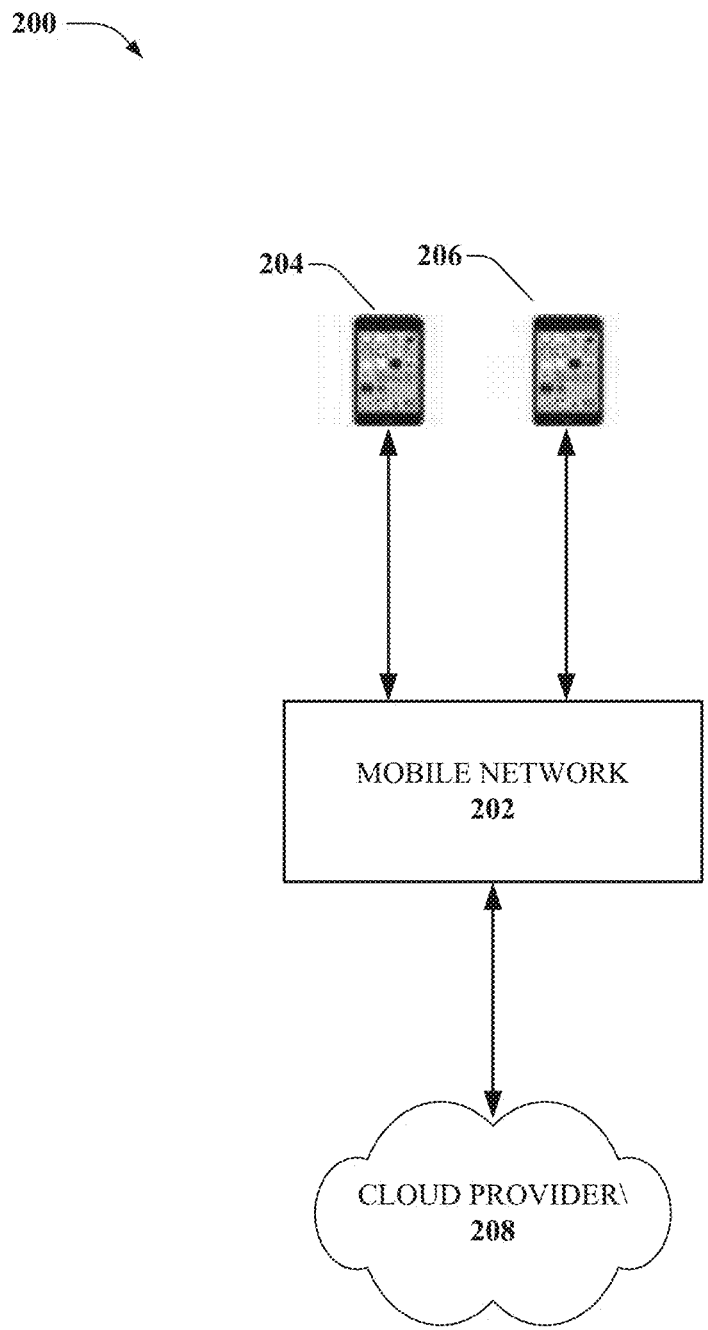
FIG. 2 is an example, non-limiting embodiment of a block diagram showing a mobile network that can dynamically instantiate policies using an intelligent persona manager in accordance with various aspects described herein.

Turning now to FIG. 2, illustrated is an example, non-limiting embodiment of a block diagram 200 showing a mobile network 202 that can dynamically instantiate policies using an intelligent persona manager in accordance with various aspects described herein.

In an embodiment, mobile network 202 can be in communication with mobile devices or other user equipments 204 and 206 and act as an intermediary between a cloud provider 208 that can provide services, applications, and other functionalities for the devices 204 and 206. In some embodiments, the user equipment 204 and 206 can be mobile devices, tablets, laptops, or desktop computers, or any other computing devices or combinations thereof. An active session that the user equipment 204 has with the mobile network 202 or with the cloud provider 208 can have one or more data streams depending on which applications are active on the user equipment 204. For instance, each application active on the user equipment can have one or more data streams with the mobile network 202 or cloud provider 208. In an embodiment, the mobile network 202 can transfer one or more of the data streams from the user equipment 204 to user equipment 206 or cloud provider 208.

Policies and rules can be applied by the mobile network 202 to manage services available to user equipment 204 and 206 as well as the QoS and QoE of communications between the user equipment. The policies can comprise rules about which services are available, what modes of communications are allowed between the user equipment 204 and 206 such as whether text messages are allowed, voice communications, communications via one or more applications on the user equipment and et cetera. The policies can also provide for minimum and maximum as well as targeted bandwidth, priority, dedicated bearers, and other network decisions that can affect the QoE. The sources of the policies can be the PCRF on the mobile network 202 which controls access to the mobile network, sets policies relating to multimedia usage and access, billing, QoS levels, and charging rules. Other sources of policies can comprise predefined policy databases associated with the cloud provider 208, mobile network 202, or the user equipment 204 and 206 as well as user preferences associated with the subscriber accounts.

At certain times however, and with different contextual backgrounds, different policies of the total set of potential policies can apply. The intelligent persona manager can elevate certain policies of the set of potential policies based on a persona that can be applied to either of the subscriber accounts associated with user equipment 204 and 206. For instance, in a health care setting, if user equipment 204 belonged to a patient, and user equipment 206 belonged to a doctor, the intelligent persona manager in the mobile network 202 can apply different policies or rules associated with the policies based on the type of communication. If there were an emergency, mobile network 202 may allow voice communications, or other real-time communications to be made from user equipment 204 to user equipment 206, but in other non-emergency situations, mobile network may only allow text messages or emails to be transferred. Similarly, depending on the context and purpose of the communications, mobile network 202 may enable or activate certain applications and services on either of the user equipment 204 and 206. In a healthcare setting such as this, the different personas can relate to the importance of the communications, or the purpose of the communications based on the content, timing, or parties to the communications.

Figure 3:
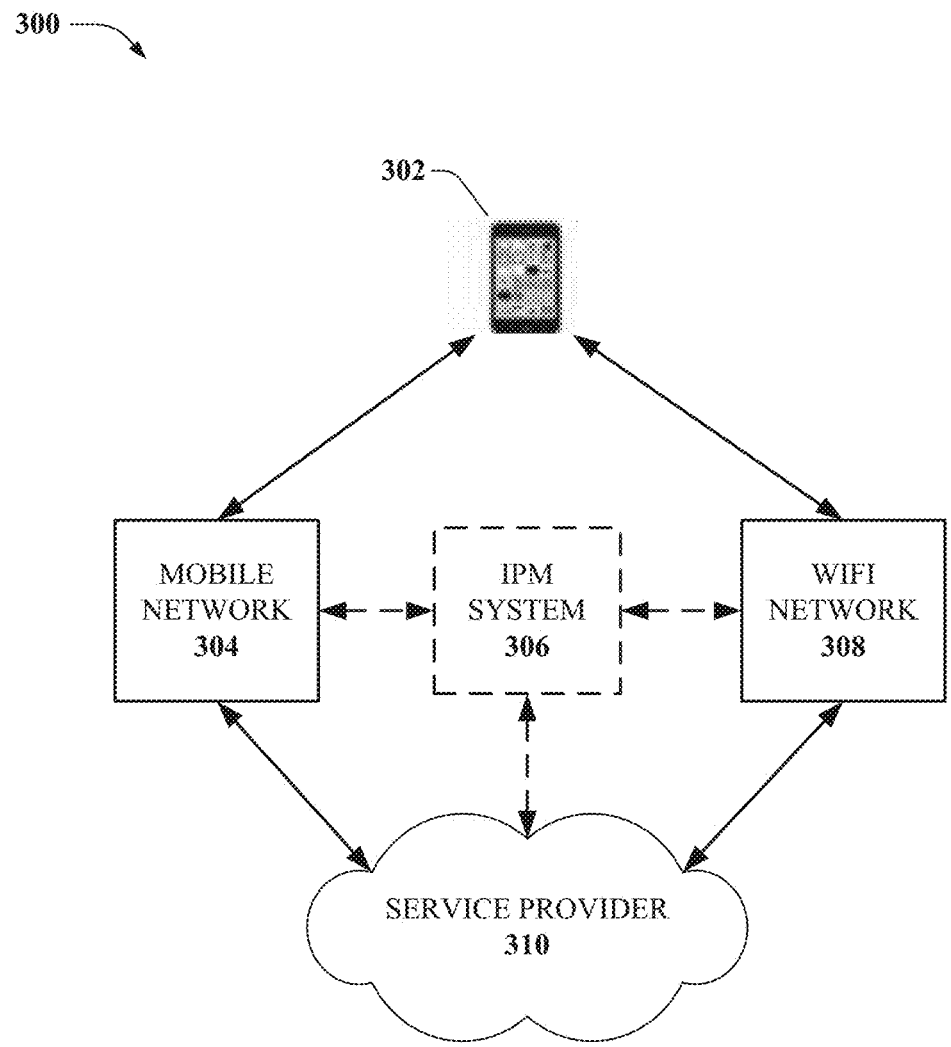
FIG. 3 is an example, non-limiting embodiment of a block diagram showing an intelligent persona manager that can dynamically instantiate policies in accordance with various aspects described herein.

Turning now to FIG. 3, illustrated is an example, non-limiting embodiment of a block diagram 300 showing an intelligent persona manager system 306 that can dynamically instantiate policies in accordance with various aspects described herein.

In an embodiment, mobile network 304 or a Wi-Fi network 308 can be in communication with a user equipment 302, and the mobile network and the Wi-Fi network 308 can act as an intermediary between a cloud service provider 310 that can provide services, applications, and other functionalities for the user equipment 302. In some embodiments, the user equipment 302 can be a mobile device, tablet, laptop, or desktop computer. An active session that the user equipment 302 has with the mobile network 304 or the Wi-Fi network 308 can have one or more data streams depending on which applications are active on the user equipment 302. For instance, each application active on the user equipment can have one or more data streams with the mobile network 304 or Wi-Fi network 308.

Policies and rules can be applied by the IPM system 306 to manage services available to user equipment 302 from service provider 310 via mobile network 304 and Wi-Fi network 308. The IPM system 306 can also manage the QoS and QoE of communications between the user equipment 302 and the service providers 310. The policies can comprise rules about which services are available, what modes of communications are allowed between the user equipment 302 and the service provider 310 such as whether text messages are allowed, voice communications, communications via one or more applications on the user equipment and et cetera. The policies can also provide for minimum and maximum as well as targeted bandwidth, priority, dedicated bearers, and other network decisions that can affect the QoE. The sources of the policies can be the PCRF on the mobile network 304 which controls access to the mobile network, sets policies relating to multimedia usage and access, billing, QoS levels, and charging rules or similar policy databases on the Wi-Fi network 308. Other sources of policies can comprise predefined policy databases associated with the cloud provider 310, mobile network 304, Wi-Fi network 308 or the user equipment 302 as well as user preferences associated with the subscriber accounts.

In an embodiment, the IPM system 306 can determine whether the mobile device 302 should receive services from the service provider 310 via mobile network 304 or Wi-Fi network 308 based on the determined persona of the communications and active sessions. For instance, a first determined persona may indicate to IPM system 306 that mobile network 304 be used to route communications, while a second persona may indicate that Wi-Fi network 308 be used to route communications.

Figure 4:
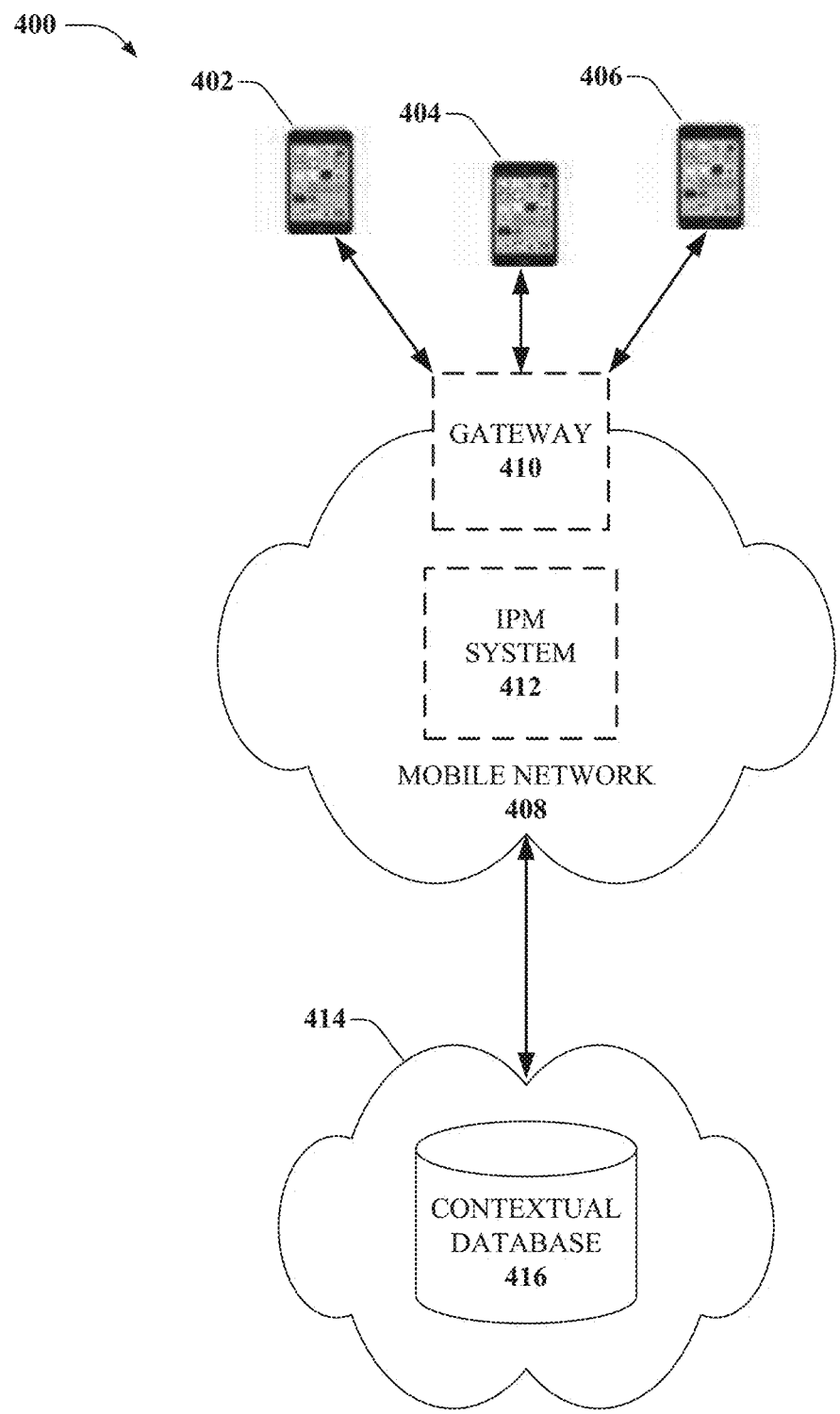
FIG. 4 is an example, non-limiting embodiment of a block diagram showing a mobile network that can dynamically instantiate policies for communications between a plurality of computing devices in accordance with various aspects described herein.

Turning now to FIG. 4, illustrated is an example, non-limiting embodiment of a block diagram 400 showing a mobile network 408 that can dynamically instantiate policies for communications between a plurality of computing devices in accordance with various aspects described herein.

In an embodiment, mobile network 408 can be in communication with mobile devices or other user equipments 402, 404, and 406. In some embodiments, the user equipment 402, 404, and 406 can be mobile devices, tablets, laptops, or desktop computers, or any other computing devices or combinations thereof. An active session that the user equipment 402 has with a gateway 410 on the mobile network 408 can have one or more data streams depending on which applications are active on the user equipment 402. In an embodiment, the user equipment 402 may be trying to initiate communications with either of user equipment 404 and/or 406.

Policies and rules can be applied by the mobile network 408 to manage services available to user equipment 402 as well as the QoS and QoE of communications between the user equipment. The policies can comprise rules about which services are available, what modes of communications are allowed between the user equipment 402 and 404/406 such as whether text messages are allowed, voice communications, communications via one or more applications on the user equipment and et cetera. The policies can also provide for minimum and maximum as well as targeted bandwidth, priority, dedicated bearers, and other network decisions that can affect the QoE.

At certain times however, and with different contextual backgrounds, different policies may apply. The intelligent persona manager system 412 on the mobile network 408 can elevate certain policies of the set of potential policies based on a persona that can be applied to the subscriber accounts associated with user equipment 402. For instance, in a health care setting, if user equipment 402 belonged to a patient, and user equipment 404/406 belonged to a doctor, the intelligent persona manager system 412 in the mobile network 408 can apply different policies or rules associated with the policies based on the type of communication. If there were an emergency, mobile network IPM system 412 can determine that a high priority persona is associated with the communications and may allow voice communications, or other real-time communications to be made from user equipment 402 to user equipment 404/406, but in other non-emergency situations, the mobile network 408 and gateway 410 may only allow text messages or emails to be transferred. Similarly, depending on the context and purpose of the communications, IPM system 412 may enable or activate certain applications and services on either of the user equipment 402, 404, and 406. The IPM system 412 can use contextual information in a contextual database 416 in a cloud network 414 to help determine the persona to apply to the communications. For instance, contextual database 416 can in some embodiments comprise information about prescriptions, treatment history, and other information that can be used by the IPM system 412 to determine the persona.

Figure 5:
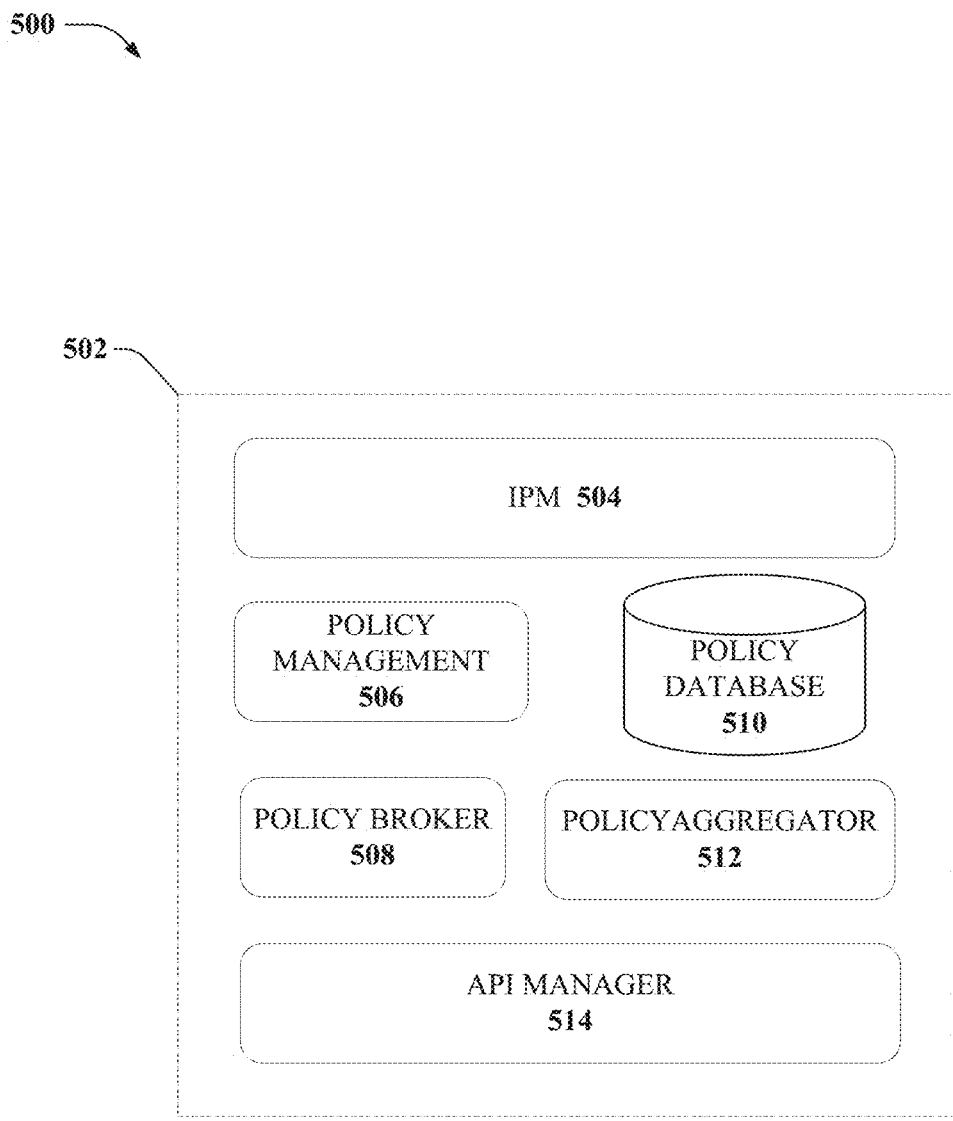
FIG. 5 is an example, non-limiting embodiment of a block diagram of an intelligent persona manager system in accordance with various aspects described herein.

Turning now to FIG. 5, illustrated is an example, non-limiting embodiment of a block diagram 500 of an intelligent persona manager system 502 in accordance with various aspects described herein. The intelligent persona manager system 502 can comprise an intelligent persona manager 504 that makes determines about which persona is associated with communications and active sessions from user equipment and other devices. A policy management component 506 can be included to weight policies and factors to place different values and/or priorities to different policies according to context.

A policy database 510 can be used to store policies and policy information retrieved via a policy aggregator 512 that can search for, and collect policy information from third party sources as well as policy information from such locations as a PCRF on a mobile network, and similar databases on other networks. A policy broker 508 can be included to analyze policies from different sources, and present them to the IPM 504 in an intelligent manner. The policy broker 508 will be able to communicate with external sources both to provide the policies and also retrieve policies from given third party service providers. An API (Application Program Interface) manager 514 can be provided to manage any third party service provider as an additional source/benefit.

Figure 6:
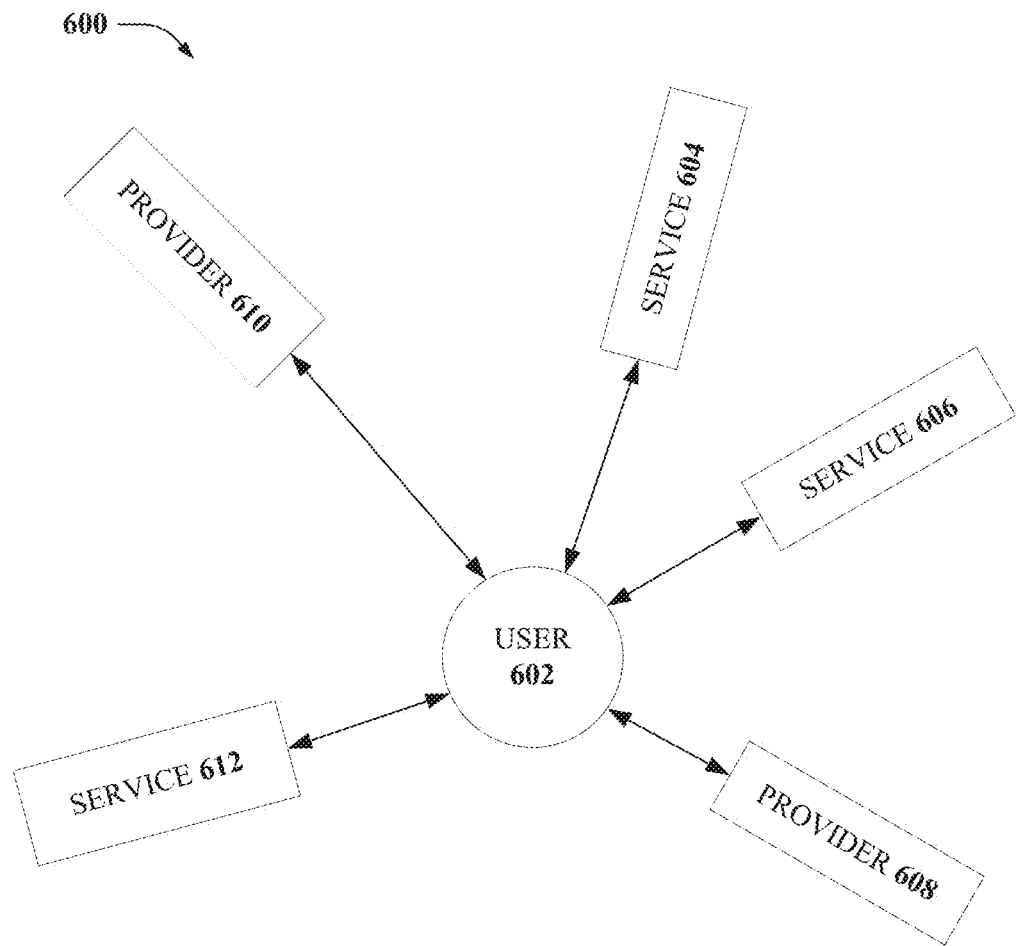
FIG. 6 is an example, non-limiting embodiment of a block diagram graph database for an intelligent persona manager system in accordance with various aspects described herein.

Turning now to FIG. 6, illustrated is an example, non-limiting embodiment of a block diagram graph database 600 for an intelligent persona manager system in accordance with various aspects described herein. The graph database 600 can be used to compare and evaluate existing contracts in order to determine which persona to apply. The intelligent persona manager can determine relationships between nodes of a graph database, wherein the persona is related to the edges of the graph database, and the nodes are related to the subscriber accounts and devices associated with the active session. For instance, a user 602 can have multiple "contracts" with different services (e.g., 604, 606, and 612) and providers (e.g., 608 and 610). At certain times, and depending on who the communications are to and from, the system can select and apply certain policies derived from these contracts that the system would not apply in other circumstances.

Figure 7:
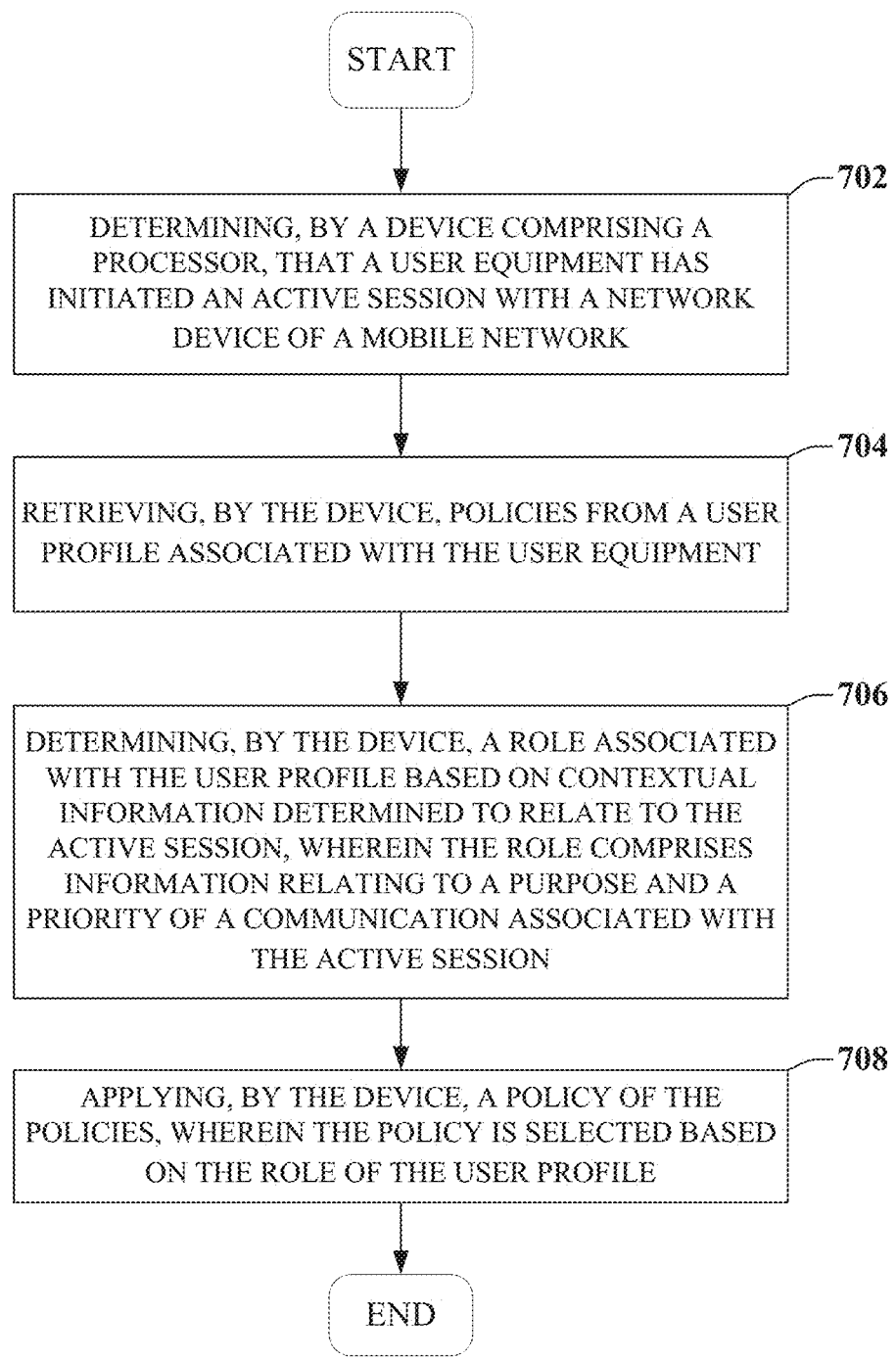
FIG. 7 illustrates a flow diagram of an example, non-limiting embodiment of a method for dynamically instantiating policies via an intelligent persona manager as described herein.
Figure 8:
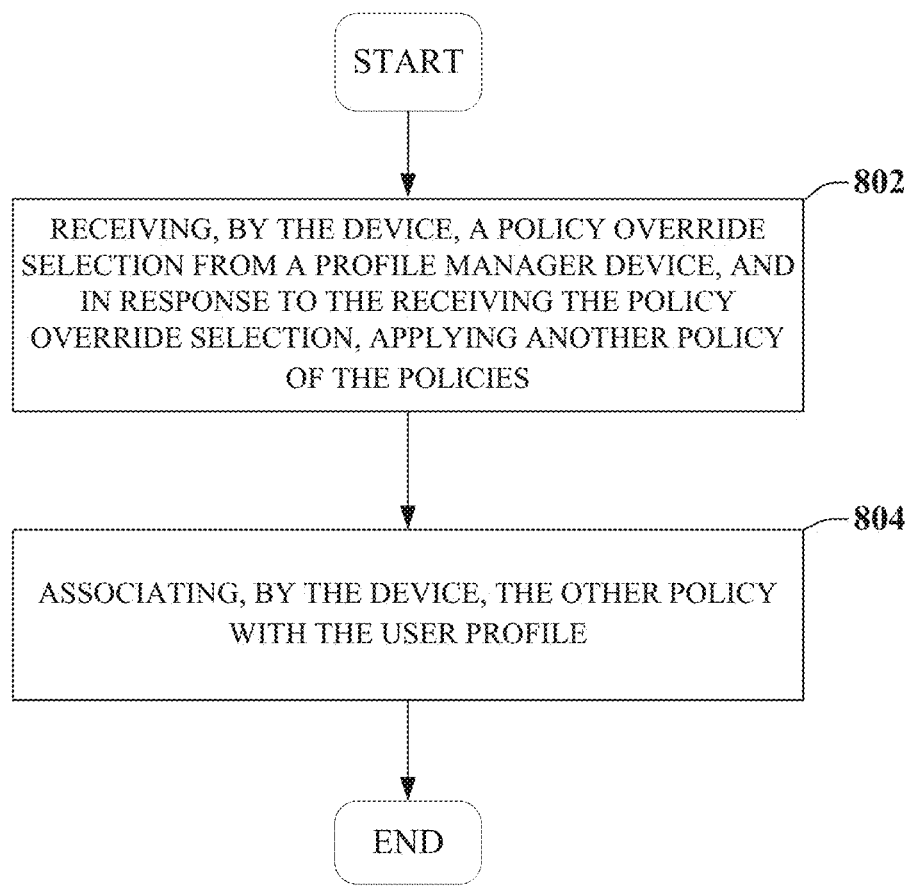
FIG. 8 illustrates a flow diagram of an example, non-limiting embodiment of a method for dynamically instantiating policies via an intelligent persona manager as described herein.

FIGS. 7-8 illustrates a process in connection with the aforementioned systems. The processes in FIGS. 7-8 can be implemented for example by the systems in FIGS. 1-6. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of an example, non-limiting embodiment of a method 700 for dynamically instantiating policies via an intelligent persona manager as described herein.

Method 700 can begin at 702 where the method comprises determining, by a device comprising a processor, that a user equipment has initiated an active session with a network device of a mobile network.

At method step 704, the method comprises retrieving, by the device, policies from a user profile associated with the user equipment. At 706, the method comprises determining, by the device, a role associated with the user profile based on contextual information determined to relate to the active session, wherein the role comprises information relating to a purpose and a priority of a communication associated with the active session. At 708, the method comprises applying, by the device, a policy of the policies, wherein the policy is selected based on the role of the user profile.

Turning now to FIG. 8, illustrates a flow diagram of an example, non-limiting embodiment of a method 800 for dynamically instantiating policies via an intelligent persona manager as described herein.

Method 800 can begin at 802 where the method comprises receiving, by the device, a policy override selection from a profile manager device, and in response to the receiving the policy override selection, applying another policy of the policies. At 804 the method comprises associating, by the device, the other policy with the user profile.

Figure 9:
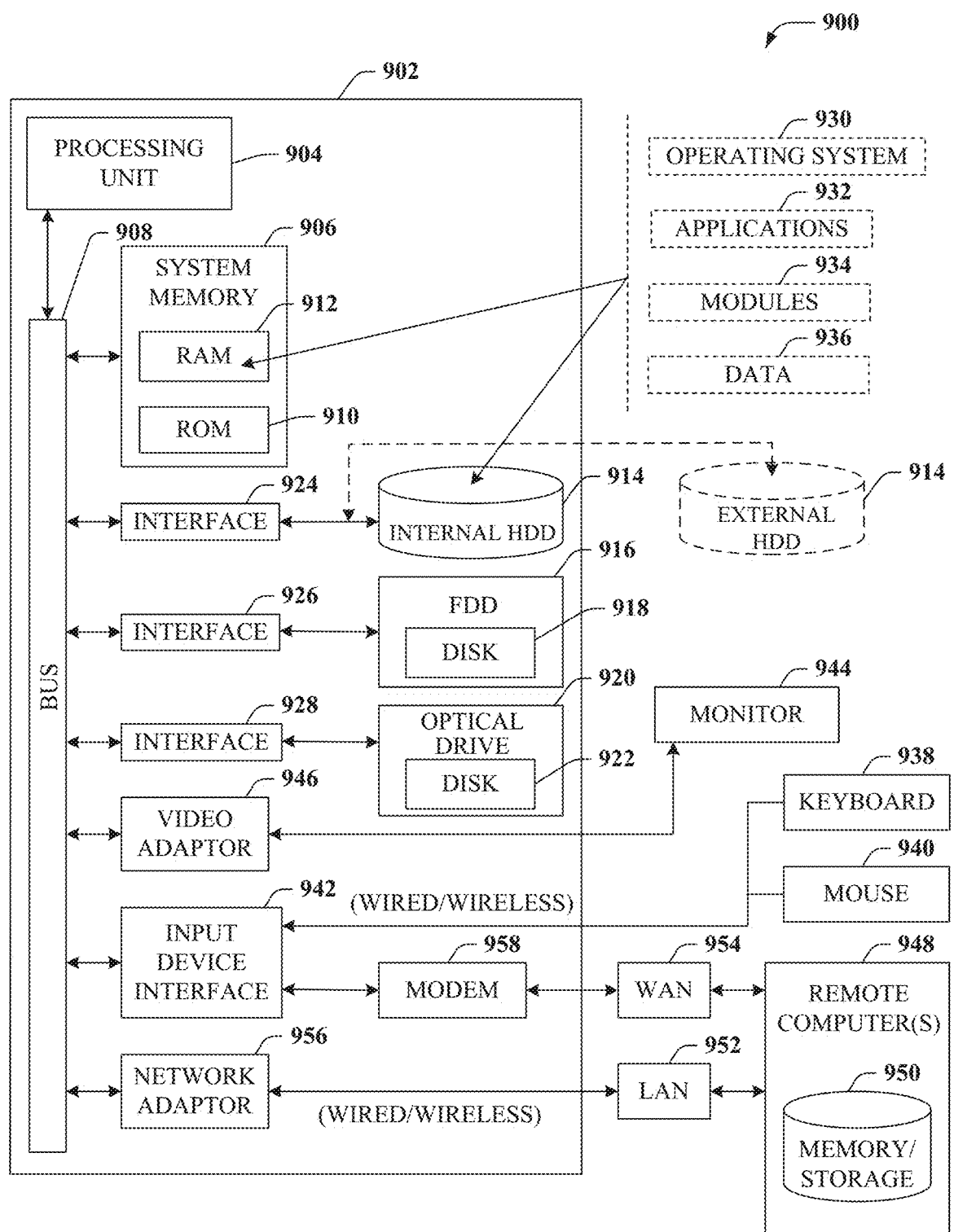
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600, and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 9, the example environment 900 for implementing various embodiments of the aspects described herein comprises a computer 902, the computer 902 comprising a processing unit 904, a system memory 906 and a system bus 908. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, comprising an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can comprise a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically comprises other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also comprise a wireless AP disposed thereon for communicating with the wireless adapter 956.

When used in a WAN networking environment, the computer 902 can comprise a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 1002 can provide the environment and/or setting in which one or more of the dynamic secure mobile network systems disclosed in FIGS. 1-6 can be operated from.

Figure 10:
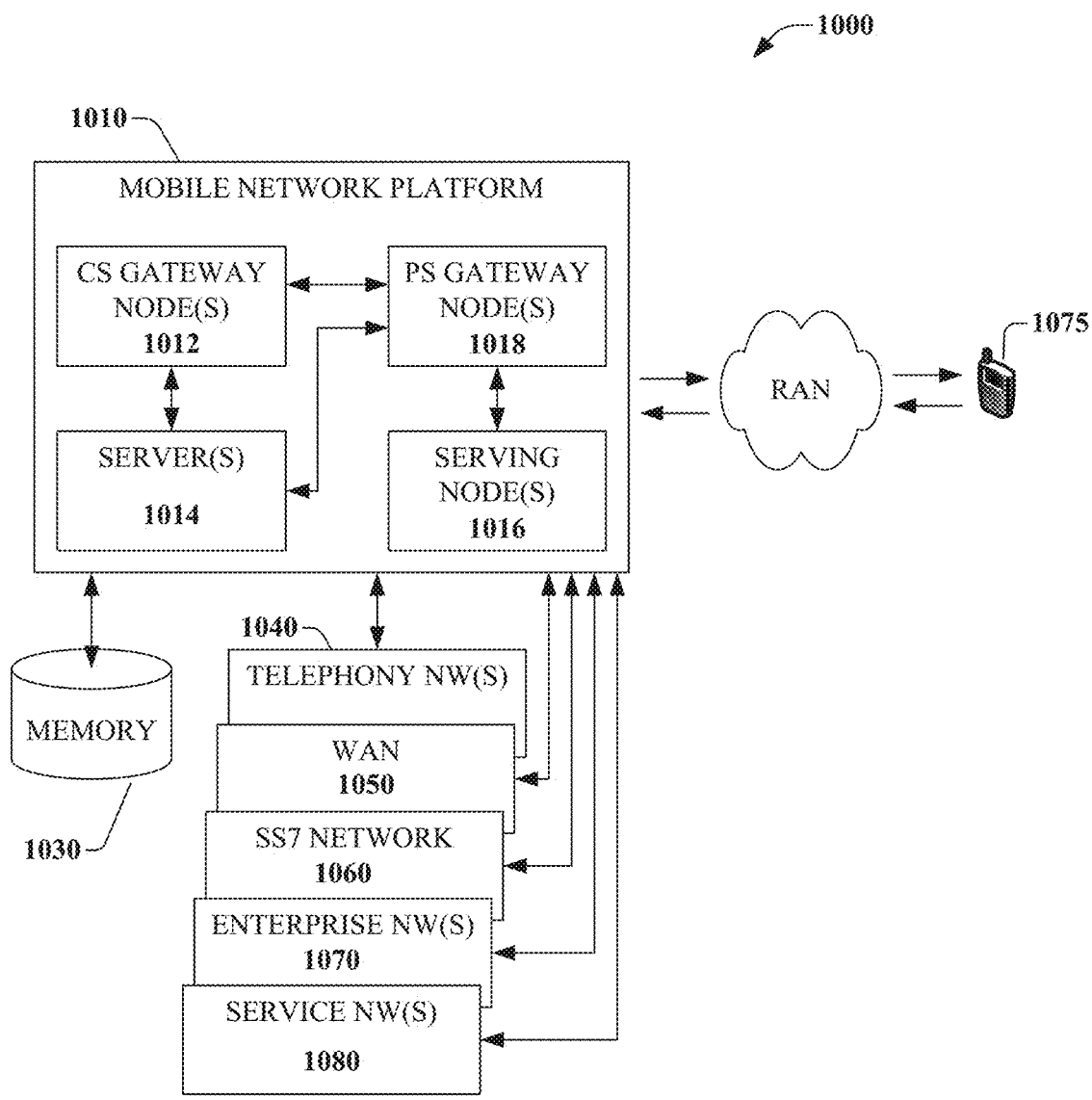
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 comprises CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice)

arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication. Mobile network platform 1010 can also comprise the MMEs, HSS/PCRFs, SGWs, and PGWs disclosed herein.

In addition to receiving and processing CS-switched traffic and signaling, PS gateway node(s) 1018 can authorize and authenticate PS-based data sessions with served mobile devices. Data sessions can comprise traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also comprises serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can comprise one or more processors configured to confer at least in part the functionality of macro network platform 1010. To that end, the one or more processor can execute code instructions stored in memory 1030, for example. It is should be appreciated that server(s) 1014 can comprise a content manager 1015, which operates in substantially the same manner as described hereinbefore.

In example embodiment 1000, memory 1030 can store information related to operation of wireless network platform 1010. Other operational information can comprise provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    determining, by a device comprising a processor, that a user equipment device has initiated an active session with a network device of a mobile network;
    retrieving, by the device, policies from a user profile associated with the user equipment device and from a subscriber account associated with the network device, wherein the policies are retrieved using a policy aggregator that is associated with an intelligent persona manager that incorporates an application program interface manager, after a search of the policies that are collected from devices associated with a third party, and a policy and charging rules function device of a mobile network, and wherein the policies are based on a type of entity associated with the active session comprising data streams;
    analyzing, by a policy broker of the device, the policies, wherein the policy broker communicates to provide the policies to external source devices and retrieve the policies from service provider devices associated with service providers;
    determining, by the device, a first role associated with the user profile, and a second role associated with the network device based on contextual information determined to relate to the active session, wherein the first role and the second role are determined based on an analysis of a graph structure that compares existing contracts to select the first role, wherein the first role and second role are related to edges of the graph and communication with a second persona device associated with the second persona is via Wi-Fi communications, and wherein the first role and the second role comprise information relating to purpose and priority of communication associated with the active session, wherein the contextual information is determined as a function of a time of usage of the user equipment device, an application of the user equipment device, a service associated with the active session, content of the communication associated with the active session, party information relating to a party to the communication, and a location of the user equipment device, wherein the contextual information comprises a prescription information, and a treatment history;
    determining, by the device, a priority level of the active session based on the time of usage of the user equipment device, the content of the communication associated with the active session, the party information relating to the party to the communication and the location of the user equipment, wherein the priority level is based on a likelihood of a medical emergency situation arising; and
    applying, by the device, a policy of the policies, wherein the policy is selected, using the intelligent manager, based on the first role of the user profile and the second role of the network device, a relationship between the first role and the second role, and the priority level and wherein applying the policy changes a functionality of the user equipment device by enabling a text message communication functionality of the user equipment device in response to a determination that the urgency ranking indicates a non-emergency situation.

2. The method of claim 1, wherein the policy comprises a rule associated with an availability of the service and the priority of the communication.

3. The method of claim 1, wherein the policy is further selected based on at least one of the policy and charging rules function, an availability of the policies in a policy data store, and preference information associated with a preference of a user identity of the user profile.

4. The method of claim 1, wherein the policy is a first policy, and further comprising:
receiving, by the device, a policy override selection from a profile manager device; and
in response to the receiving the policy override selection, applying, by the device, a second policy of the policies to the text message communication functionality of the user equipment device and adjusting a role selection process.

5. The method of claim 4, further comprising:
associating, by the device, the second policy with the user profile.

6. The method of claim 1, wherein the policy is a first policy, and further comprising:
retrieving, by the device, from a first policy data store determined not to be associated with the mobile network associated with the active session, a second policy related to the user profile.

7. The method of claim 6, further comprising:
sending, by the device, the second policy to a second policy data store determined to be associated with the mobile network to be stored by the second policy data store.

8. A non-transitory machine-readable storage medium, comprising executable instructions that, when executed by a processor, facilitate performance of operations, comprising:
determining that a first device associated with a subscriber account assigned to a subscriber identity has initiated an active session with a second device;
in response to requesting policies associated with a first subscriber account associated with the first device and a second subscriber account associated with the second device, receiving the policies, wherein the policies are retrieved, by a policy aggregator that is associated with an intelligent persona manager that incorporates an application program interface manager, after the policy aggregator conducts a search of the policies that are collected from a third party device, and a policy and charging rules function device of a mobile network, and wherein the policies are based on a type of entity associated with the active session comprising data streams;
analyzing the policies by a policy broker, wherein the policy broker communicates with external source devices to provide the policies to external source devices and retrieve the policies from service provider devices associated with service providers;
determining a first persona associated with the first subscriber account and a second persona associated with the second subscriber account based on contextual information relating to the active session, wherein the first persona and the second persona are determined based on an analysis of a graph structure that compares existing contracts to select the first persona, wherein the first persona and the second persona are related to edges of the graph structure and communication with a second persona device associated with the second persona is via Wi-Fi communications, and wherein the first persona and the second persona relate to an importance ranking of communication associated with the active session, wherein the contextual information is determined as a function of a time of usage of the first device, an application of the first device, a service associated with the active session, content of the communication associated with the active session, a party to the communication, and a location of the first device, wherein the contextual information comprises a prescription information, and a treatment history;
determining a priority level of the active session based on the time of usage of the first device, the application of the first device, the service associated with the active session, the content of the communication associated with the active session, the party to the communication, and the location of the first device, wherein the priority level is based on a likelihood of a medical emergency situation; and
applying a policy of the policies, wherein the policy is selected, by the intelligent persona manager, based on the first persona of the first subscriber account and the second persona of the second subscriber account, a relationship between the first persona and the second persona, and the priority level and wherein applying the policy changes a permission of an application determined to be executing on the first device in response to a determination that the urgency ranking indicates a non-emergency situation.

9. The non-transitory machine-readable storage medium of claim 8, wherein the policy is a first policy, and wherein the operations further comprise:
receiving a policy override selection from a profile manager device;
applying a second policy of the policies, wherein applying the second policy further changes the permission of the application determined to be executing on the first device; and
associating the second policy with the second persona.

10. The non-transitory machine-readable storage medium of claim 8, wherein the operations further comprise:
overriding the policy with a replacement policy in response to a change in the contextual information and adjusting a persona selection process.

11. The system of claim 1, wherein the operations further comprise:
determining that the contextual information is associated with a defined emergency; and
applying a temporary policy to the first device that replaces the policy and that enables the voice communication functionality of the first device.

12. A system, comprising:
a processor; and
a memory that stores executable instructions that, when executed by the processor, facilitate performance of operations, comprising:
determining that a first device associated with a subscriber account of a subscriber identity has initiated an active session with a second device;
retrieving policies associated with a first subscriber account associated with the first device and a second subscriber account associated with the second device, wherein the policies are retrieved, by a policy aggregator that is associated with an intelligent persona manager that incorporates an application program interface manager, after the policy aggregator conducts a search of the policies that are collected from devices associated with a third party, and a policy and charging rules function device of a mobile network, and wherein the policies are based on a type of entity associated with the active session comprising data streams;

analyzing the policies by a policy broker of the system, wherein the policy broker communicates to provide the policies to external source devices and retrieve the policies from service provider devices associated with service providers;

determining a first persona associated with the first subscriber account and a second persona associated with the second subscriber account based on contextual information determined to relate to the active session, wherein the first persona and the second persona are determined based on an analysis of a graph structure that compares existing contracts to select the first persona, wherein the first persona and the second persona are related to edges of the graph structure and communication with a second persona device associated with the second persona is via Wi-Fi communications, and wherein the contextual information is determined as a function of a time of usage of the first device, an application of the first device, a service associated with the active session, content of a communication associated with the active session, a party identity indicative of a party to the communication, and a location of the first device wherein the contextual information comprises a prescription information, and a treatment history;

determining an urgency ranking of the active session based on the time of usage of the first device, the application of the first device, the service associated with the active session, the content of the communication associated with the active session, the party identity indicative of the party to the communication, and the location of the first device, wherein the urgency rating is based on a likelihood of an occurrence of a medical emergency situation; and applying a policy of the policies, wherein the policy is selected, by the intelligent persona manager, based on the first persona of the first subscriber account and the second persona of the second subscriber account, a relationship between the first persona and the second persona, and the urgency ranking and wherein the applying the policy changes a functionality of the first device by disabling a voice communication functionality of the first device in response to a determination that the urgency ranking indicates a non-emergency situation.

13. The system of claim 12, wherein the policy comprises a rule associated with at least one of a quality of the service, a quality of experience of the service, a communication priority ranking of the communication associated with the active session, or an availability of the service.

14. The system of claim 12, wherein the policy is a function of the policy and charging rules function device, policy information received from a policy data store, and preference information associated with a preference of the subscriber identity.

15. The system of claim 12, wherein the first persona corresponds to a determined usage of the device.

16. The system of claim 12, wherein the policy is a first policy, and wherein the operations further comprise:
in response to receiving a policy override selection from the first device, applying a second policy of the policies, different from the first policy, to the voice communication functionality of the first device and adjusting a persona selection process.

17. The system of claim 16, wherein the operations further comprise:
associating the second policy with the first persona.

18. The system of claim 12, wherein the determining the first persona comprises determining the first persona further based on a relationship determined between nodes of the graph structure, wherein the first persona is related to edges of the graph structure, and wherein the nodes are related to devices associated with the active session and subscriber accounts corresponding to the devices.

19. The system of claim 12, wherein the policy is a first policy, wherein the operations further comprise:
initiating storage of a second policy related to the subscriber account in a first policy data store of a mobile network associated with the active session, and wherein the second policy is retrieved from a second policy data store that is not associated with the mobile network.

20. The system of claim 19, wherein the second policy data store is associated with a service provider identity determined to be associated with the active session.

\* \* \* \* \*